(12) United States Patent
Burrell (10) Patent No.: US 8,352,214 B2
(45) Date of Patent: Jan. 8, 2013

(54) BELT IMAGE ZERO TRACKING SYSTEM

(76) Inventor: Leonard Ian Burrell, Oatley (AU)

(*) Notice: Subject to any disclaimer, the term of this patent is extended or adjusted under 35 U.S.C. 154(b) by 0 days.

(21) Appl. No.: 13/501,097

(22) PCT Filed: Sep. 17, 2010

(86) PCT No.: PCT/AU2010/001216
§ 371 (c)(1),
(2), (4) Date: Apr. 9, 2012

(87) PCT Pub. No.: WO2011/044609
PCT Pub. Date: Apr. 21, 2011

(65) Prior Publication Data
US 2012/0203505 A1    Aug. 9, 2012

(30) Foreign Application Priority Data
Oct. 12, 2009  (AU) ................ 2009904974

(51) Int. Cl.
*G01G 19/03*   (2006.01)
(52) U.S. Cl. .................................. 702/175
(58) Field of Classification Search ........ 702/175, 702/172–174, 182–185
See application file for complete search history.

(56) References Cited

U.S. PATENT DOCUMENTS

| | | | |
|---|---|---|---|
| 4,392,535 A | 7/1983 | Fujii et al. | |
| 6,818,841 B1 | 11/2004 | McDonald | |
| 2009/0152348 A1* | 6/2009 | Ostrowski et al. | 235/383 |
| 2009/0217793 A1* | 9/2009 | Spillner et al. | 83/289 |
| 2010/0080672 A1* | 4/2010 | Bonora et al. | 414/222.01 |
| 2010/0294624 A1* | 11/2010 | Warner | 198/502.2 |

FOREIGN PATENT DOCUMENTS

| | | |
|---|---|---|
| JP | 59-050318 | 3/1984 |
| JP | 03-285121 | 12/1991 |
| JP | 07-280630 | 10/1995 |
| RU | 2277230 C1 | 3/2006 |

* cited by examiner

*Primary Examiner* — Edward Raymond
(74) *Attorney, Agent, or Firm* — Steptoe & Johnson LLP (57) ABSTRACT

A belt weighing system, including a belt passing over a weigh frame able to measure the weight of conveyed material, and at least one memory to store a zero image for the belt. At least one processor able to determine differences between a measured belt weight and a stored zero image for corresponding points or sections of the belt, and to determine if the differences are constant for different sections of the belt. A condition for an empty belt state can be detected where the instantaneous difference between the stored zero image and the measured belt weight for corresponding belt points or sections is equal to an average difference for different belt points or sections.

21 Claims, 7 Drawing Sheets

FIGURE 1

(prior art)

BELT IMAGE ZERO TRACKING SYSTEM

CROSS-REFERENCE TO RELATED APPLICATIONS

This application claims priority to International Application No. PCT/AU2010/001216 filed on Sep. 17, 2010, which claims priority to Australian Patent Application No. 2009904974, filed Oct. 12, 2009, each of which is incorporated by reference in its entirety.

TECHNICAL FIELD

The present invention generally relates to the field of conveyor belt weighing systems. More particularly, the present invention relates to zero adjustment or zero tracking of belt weighing systems.

BACKGROUND

Figure 1:
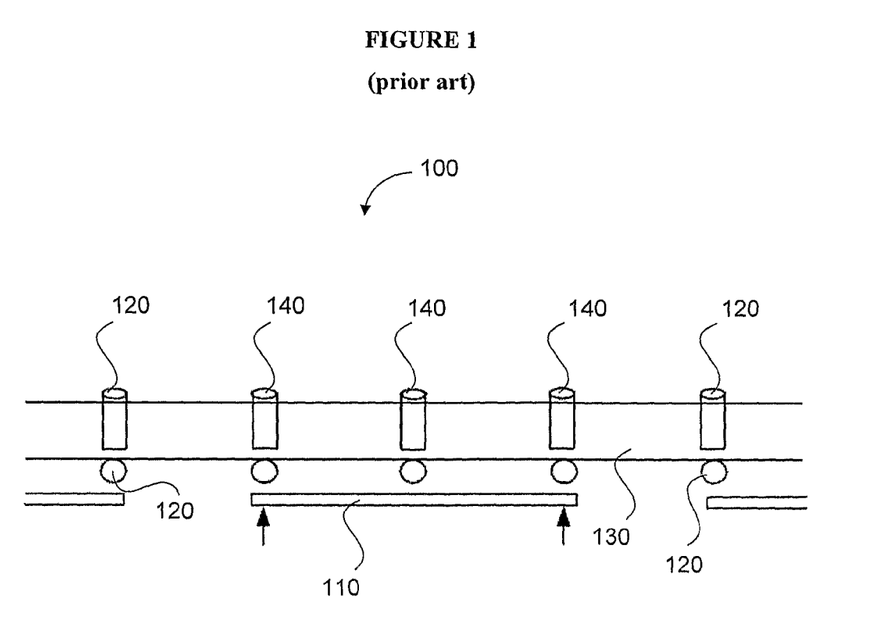
FIG. 1 (prior art) illustrates an example fully suspended weigh frame.

Referring to FIG. 1, by way of example background, there is illustrated a known conventional fully suspended weigh frame 110 forming part of a belt weighing system 100. Belt weighing system 100 includes idlers (i.e. rollers) 120 spaced apart to support belt 130. Idlers 140 are part of fully suspended weigh frame 110. Conveyed material, for example bulk material or process material used or produced in mining or industrial processing, being transported along belt 130 imparts its weight via belt 130 and idlers 140 and can be measured by weigh frame 110. Accurate weighing is required for bulk handling of materials in many diverse industries, for example mining, ship loading, rail loading, grain, coal power, wool scouring, quarry, food and chemical industries, etc.

Figure 2:
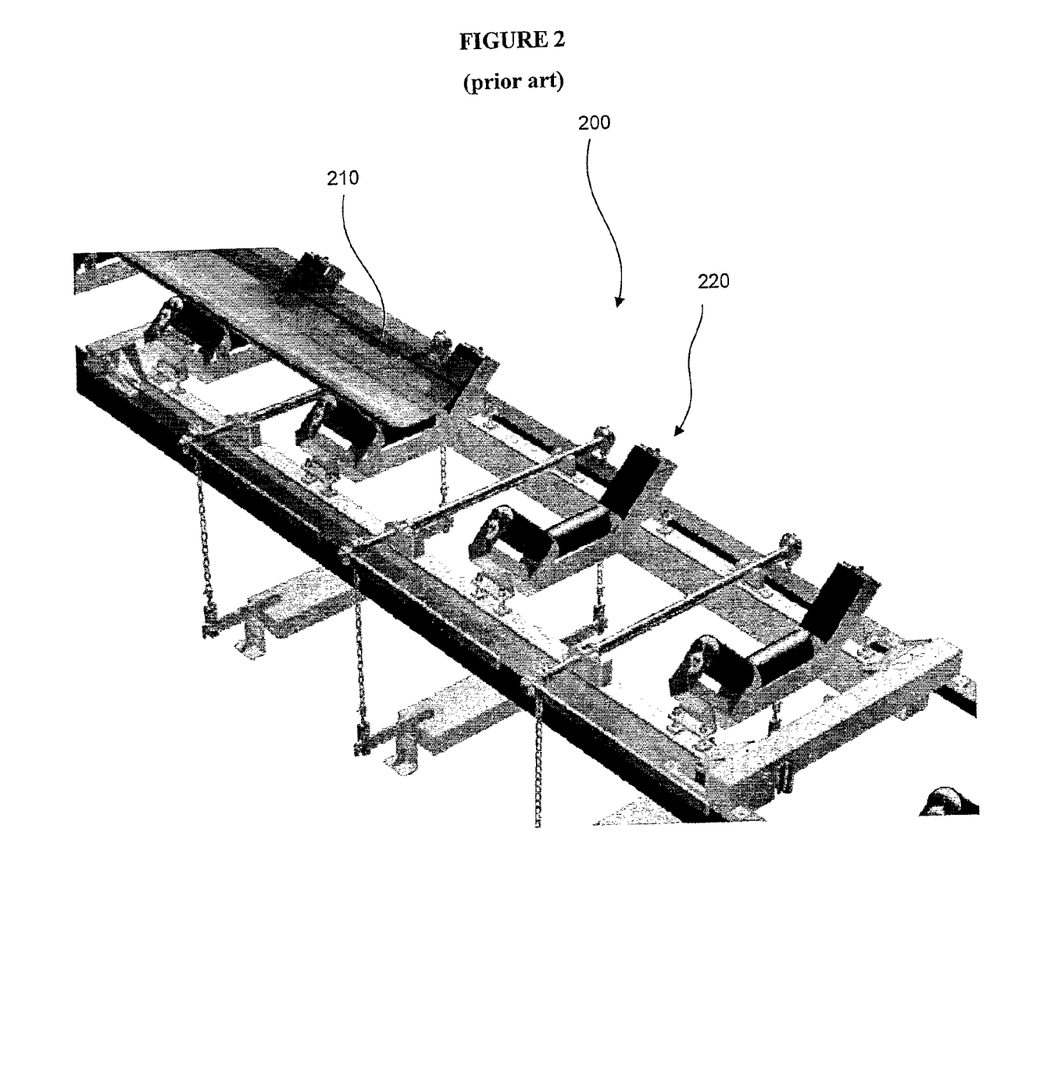
FIG. 2 (prior art) illustrates an example belt weighing system.

Referring to FIG. 2, providing a further example as illustrative background, there is shown a section of a belt weighing system 200. Belt weighing system 200 includes a belt 210 supported by idlers 220 (which should also be read as reference to a set of idlers) that are spaced apart from other belt supporting idlers. Material being transported by belt 210 imparts its weight via belt 210 and idlers 220 and can be measured by a weigh frame of the belt weighing system 200.

There have been many approaches in attempting to develop a reliably accurate conveyor belt weighing system. One particular aspect requiring improvement involves determining a suitably accurate zero measurement and a resultant zero adjustment for actual weight measurements in belt weighing systems.

For many years the zero adjustment of a belt weighing system has involved finding the average weight of the static components of the weighing system plus the dynamic weight of the empty belt. This average zero constant weight is then subtracted from a measured total weight of zero mass and moving material over a weigh frame for every measurement calculation.

However, the resultant integration of total material weighed is only exactly correct once for each complete belt revolution. Recently 'zero image' systems have been developed which keep a multiplicity of zero constants in a computer or digital memory for the empty conveyor belt and these systems retrieve the appropriate zero constant for the corresponding piece or section of belt over the weigh frame from the memory when the section of belt is over the weigh zone. With this type of system, the instantaneous weight result is correct within the tolerance of the weighing system at each calculation.

The Applicant has previously improved zero image systems to provide automatic tracking in zero image systems, that is the automatic capture of a correct zero setting for a conveyor belt without operator intervention. This known system provides for the capture of an average zero constant (conventional belt weigher zero) and a new multiplicity of zeroes for the entire belt known as the zero image.

The crux of automatic tracking of a zero adjustment is how to make the decision that the belt is actually empty. Zero shifts of all sizes can occur, for example typical zero shifts might be 0.1%, 0.5% or 2.0% FSD. One known technique to detect an 'empty belt' state is to establish a one sided 'zero window', being a tolerance above zero that is assumed to be close enough to zero that the belt is probably empty. A typical zero window might be say 4.0% FSD, so a zero error of as much as 2.0% along with natural belt weight variation would likely still fit within the zero window. All weight results less than the zero 'window' or 'zero level' are deemed to require consideration for calculating a zero adjustment.

In the Applicant's known belt weighing system, a pre-timer is used, so measurements of belt weight are required to be within the zero window, remain there for the duration of time set by the pre-timer and then continue to remain within the zero window for one complete belt revolution. If these requirements are satisfied, then a new average weight for the weigh frame and belt is obtained, which provides a new candidate zero constant. The new candidate zero constant is then exposed to several verification or 'sanity' checks before being put into service.

The principle verification check currently used by the Applicant is a 'zero tracking limit', being a cumulative amount of zero adjustment that the user is prepared to allow before an alarm is raised to bring the user's attention to the weighing system. This cumulative amount is compared to the last manually initiated Zero Adjustment which becomes the reference for the Limit Alarm. The zero tracking limit might be, for example, 3.0%. This is to say that if the new candidate zero setting now proposed is different by 3.0% or more to the last manually established zero setting then this new candidate zero constant is not allowed, an alarm is raised and the zero is limited to the alarm trigger level. The weigh frame might have been slowly being weighed down with process material and the alarm summons the user to check the weighing system and either clean down the weigh frame or re-zero the weighing system manually, thus re-establishing the reference point for the zero tracking alarm.

Another verification check presently used by the Applicant is the 'zero skip' system where the new candidate zero setting is checked against the last 'x' zero attempts and when all these agree within y % then the new candidate zero constant may be used. For instance, a new zero constant might be required to be within 0.1% when compared to the previous three zero attempts. If a zero is attempted but does not meet this criteria, the zero constant is stored in memory and a display registers an instance of a 'zero skip' having occurred. The system could look say at the last three zero attempts, if all attempts met the criteria then they are used as the last three zero tracks, if there were zero skips in the last three attempts the system looks at the last three zeros anyway, whether successful or not. The zero skip system is a good way of keeping zero constants accurate, but if there is a major zero shift it would take 'x', for example three with the example settings, zero attempts to establish a new zero.

In real life, zero adjustment opportunities can be very limited due to continuous operation and multiple zero attempts may never happen. However, improved zero tracking is necessary, in an unattended weighing system zero tracking needs to be foolproof otherwise zero tracking can actually exacerbate zero error problems. For example, attempted automatic tracking of a zero adjustment might easily be 'tricked' by a trickle of process material or some other transitory affect.

Another significant disadvantage of known prior art systems is that a conveyor belt must complete a full belt revolution to properly detect a zero condition and propose a new zero adjustment.

There is a need for an improved belt weighing system and/or a method of zero adjustment, tracking or determination which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

BRIEF SUMMARY OF INVENTION

The present invention provides a system and/or method for automatic tracking or determination of a zero adjustment (i.e. zero tracking). An empty belt state is reliably detected without requiring a complete conveyor belt revolution. In a particular embodiment, a zero adjustment is obtained from sampling a section of the belt. This provides significant advantages such as more efficient and more effective automatic tracking of zero adjustments.

In an example form there is provided a belt weighing system, comprising: a belt, for conveying material, associated with a weigh frame; the weigh frame able to measure a belt weight of a section of the belt; at least one memory to store a zero image of the belt; and, at least one processor to determine a difference between the measured belt weight and the zero image for the section of the belt, and to determine when the difference is a constant in relation to different sections of the belt.

Preferably, if the difference is a constant in relation to different sections of the belt, the system assumes an empty belt state. Optionally, the at least one memory stores an average of determined differences for different sections of the belt. Also optionally, the at least one processor determines if the difference is a constant in relation to different sections of the belt by determining if the difference for the section of the belt is substantially equal to the stored average.

According to one aspect an output device is used to output a zero adjusted weight of conveyed material. In another aspect there is provided a synchronisation means to check the belt is aligned with the zero image of the belt. In another aspect there is provided a sensor to identify a marker in or on the belt, the sensor used to provide a synchronising pulse or signal. Optionally, the marker is a magnetic material or a visual indicator or an RFID or other device achieving the same result.

In another aspect if the average satisfies verification criteria, the average is used as an adjustment made to at least part of the zero image. In yet another aspect if the difference is determined to be a constant in relation to different sections of the belt, the constant is used as an adjustment made to at least part of the zero image.

In yet another example form there is provided a method of identifying when a belt is in an empty state in a belt weighing system, the method performed in a processing system associated with a weigh frame and including the steps of: checking if an instantaneous difference between a stored zero image and a measured belt weight for a section of the belt is equal to a stored average difference; and if so, identifying the belt to be in an empty state.

In yet another example form there is provided a method of making a zero adjustment in a belt weighing system, the method performed in a processing system associated with a weigh frame and including the steps of: determining differences between measured belt weights and a stored zero image for corresponding sections of the belt; checking if the differences are a constant for different sections of the belt; and if so, adjusting at least part of the zero image by using the constant.

Optionally, the belt is determined to be in an empty state when the differences are constant to within less than a user settable limit. Preferably, the processing system determines if the differences are a constant for different sections of the belt by determining if an instantaneous difference between the zero image and the measured belt weight for a section of the belt is equal to an average difference for different sections of the belt. Also preferably, the belt is determined to be in an empty state when the instantaneous difference is equal to the average difference to within less than a user settable limit. In another aspect the average difference is a running average of differences between the zero image and the measured belt weights for different sections of the belt.

In yet another aspect determining if the instantaneous difference between the zero image and the measured belt weight for the section of the belt is equal to the average difference includes: (1) calculating the average difference for a selected number of previous belt segments; (2) calculating the instantaneous difference between the measured belt weight and the zero image for a current segment; (3) calculating a difference between the average difference calculated at step (1) and the instantaneous difference calculated at step (2); and, (4) determining if the difference calculated at step (3) is less than a preset value, and if so assuming the instantaneous difference to be equal to the average difference.

According to a particular embodiment, the at least one processor is provided as processing electronics, which may be custom built, used to distinguish between a constant loading on the weigh frame, such as is caused by process material resting upon the weigh frame, and real process material running on the belt. In this example form, the zero image zero adjustment system, which uses a multiplicity of zero constants each applied in synch with the real belt, provides a flat or constant output or indeed constant offset between the current operational zero setting and the real zero condition experienced in operation. In the vast majority of systems, real material running on a conveyor belt is much more variable and when compared to the zero image can show a constant variation against zero, rather than a constant difference. The use of statistical techniques such as the standard deviation of the difference between the weigh frame weight and the zero image can be used to allow the variability of real material flow to be distinguished from the known variability of the empty belt. The decision can be made, for example, based on the variability of the loading and the known variability sampled when the belt was known to be running empty. Preferably, though not necessarily, this known condition of the system, along with other safe guards such as 'the flow is less than a certain level' say less than 10% of design belt loading or the condition must exist for a minimum time period, can be used to increase the security or confidence of the decision when very smooth flows of process material are experienced.

According to an alternate form of the invention, an empty belt state can be detected from the measured weight data using pattern recognition techniques as opposed to calculating a simple difference between values.

BRIEF DESCRIPTION OF FIGURES

Example embodiments should become apparent from the following description, which is given by way of example only, of at least one preferred but non-limiting embodiment, described in connection with the accompanying figures.

PREFERRED EMBODIMENTS

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

In a particular embodiment there is provided a belt image zero tracking system and method. This provides for automatic tracking of a zero adjustment (i.e. zero tracking).

In a particular embodiment there is provided a belt weighing system, comprising a belt, for conveying material, associated with a weigh frame. The weigh frame is able to measure a weight for a section of the belt. Example weigh frames include fully suspended weigh frames, dual pivoted "approach-retreat" type weigh frames, amongst others, that are known in the art. At least one memory is provided and is able to store a zero image for the belt. Also, at least one processor, which may be dedicated processing electronics, a microprocessor, a custom built electronics system, a programmed general purpose processing system, etc., is provided and is able to determine differences between measured belt weights and the zero image for corresponding sections of the belt. Furthermore, the processor can determine if the differences are a constant for different sections of the belt, thereby indicating an empty belt state.

The at least one processor can be used to determine a difference between the measured (i.e. observed) belt weight (i.e. empty belt weight plus any conveyed material weight) and the zero image for the section of the belt, preferably stored in a memory. The processor seeks to determine when the difference is a constant, the within an acceptable, calculated or preset limit, in relation to different sections of the belt. Noting that the measured belt weight may be temporarily or more permanently stored for the purpose of determining the difference.

Figure 3A:
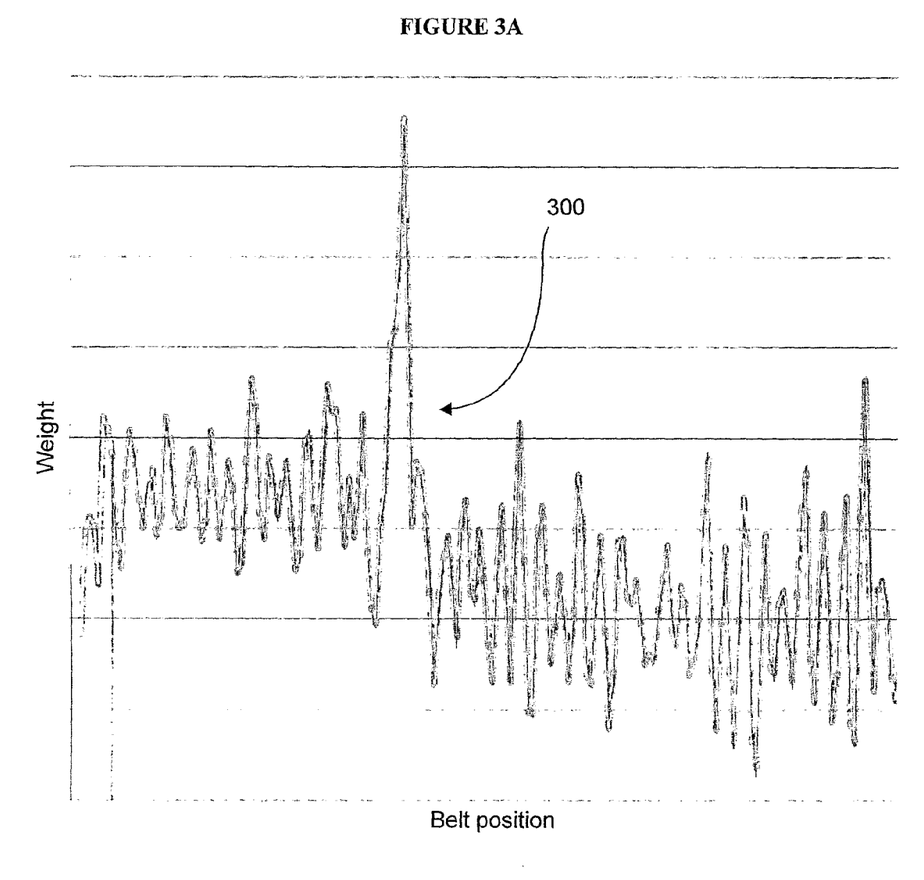
FIG. 3A illustrates a graph of the zero image of an example conveyor belt.

Referring to FIG. 3A, there is shown a graph of a record 300 of the zero image of an example conveyor belt, the abscissa (indicative of position along belt) and ordinate (indicative of weight) units are not relevant. The graph is actually two separate plots of data superimposed one over the other. One of the plots is a record of the zero image for the belt recorded in a memory of the system and is in fact the working zero setting of the belt weighing system. The other plot is a record of the actual measured weight of the belt. Each data point on the graph, and there are some 279 of them in this particular example illustration, is a record of the appropriate zero setting recorded in the memory for a section of belt and the actual measured weight of that same section of belt over the weighing zone which is being weighed or observed some time later.

Figure 3B:
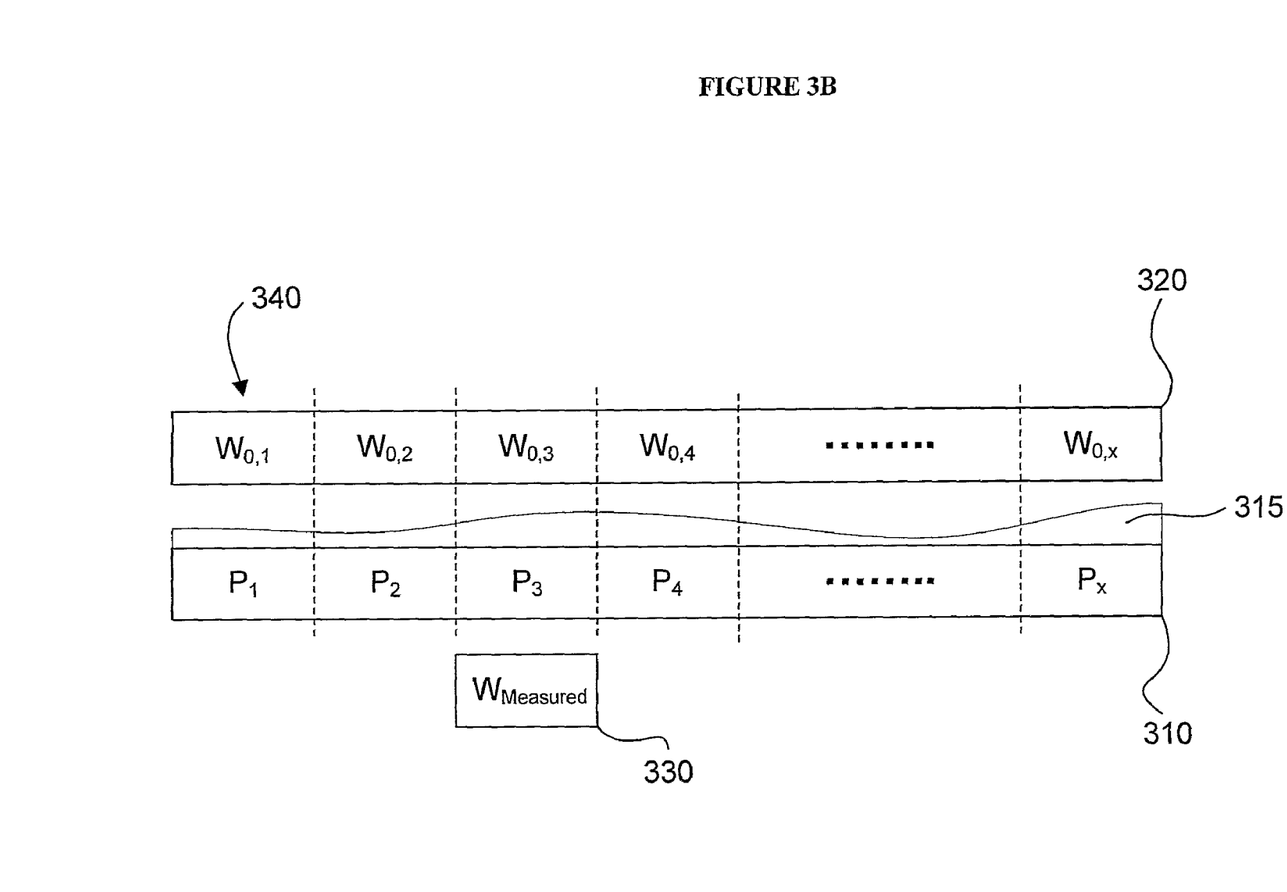
FIG. 3B illustrates an example visualisation of a zero image and a conveyor belt.

Referring to FIG. 3B, there is illustrated an example visualisation of a zero image and a conveyor belt. The physical belt 310 has points or sections 340 represented as positions (P) being $P_1, P_2, P_3, P_4, \ldots P_x$. Belt 310 supports a variable load of material 315. Belt 310 passes over weighing zone 330 where an observed weight, $W_{Measured}$, is measured for each of the positions P. Associated with physical belt 310 is a zero image 320, typically stored as data in a memory of a processing system. Zero image 320 has corresponding points or sections 340 that correspond to the physical belt 310. Zero image 320 provides the zero settings ($W_0$) being $W_{0,1}, W_{0,2}, W_{0,3}, W_{0,4}, \ldots W_{0,x}$ that correspond to physical positions $P_1, P_2, P_3, P_4, \ldots P_x$. The dimensions shown in FIG. 3B are arbitrary and not to scale. The number, size or resolution of points or sections 340 can be varied. It is not necessary that the weighing zone width correspond to a belt section width, this is indicated for illustration only.

The Applicant realised, unexpectedly given the state of the prior art, that this type of data obtained from the belt weighing system actually can be used to detect an empty belt state. This revelation means that an empty belt state can be detected by comparing the recorded zero image with the observed belt weight. When the difference between the recorded zero image and the observed belt weight image is a constant, or is substantially constant to within an error limit, for the same section of belt, then the belt is empty and the difference is the required zero adjustment. For example, a difference calculation or pattern recognition technique can used to provide an indication of an empty belt state.

Figure 4:
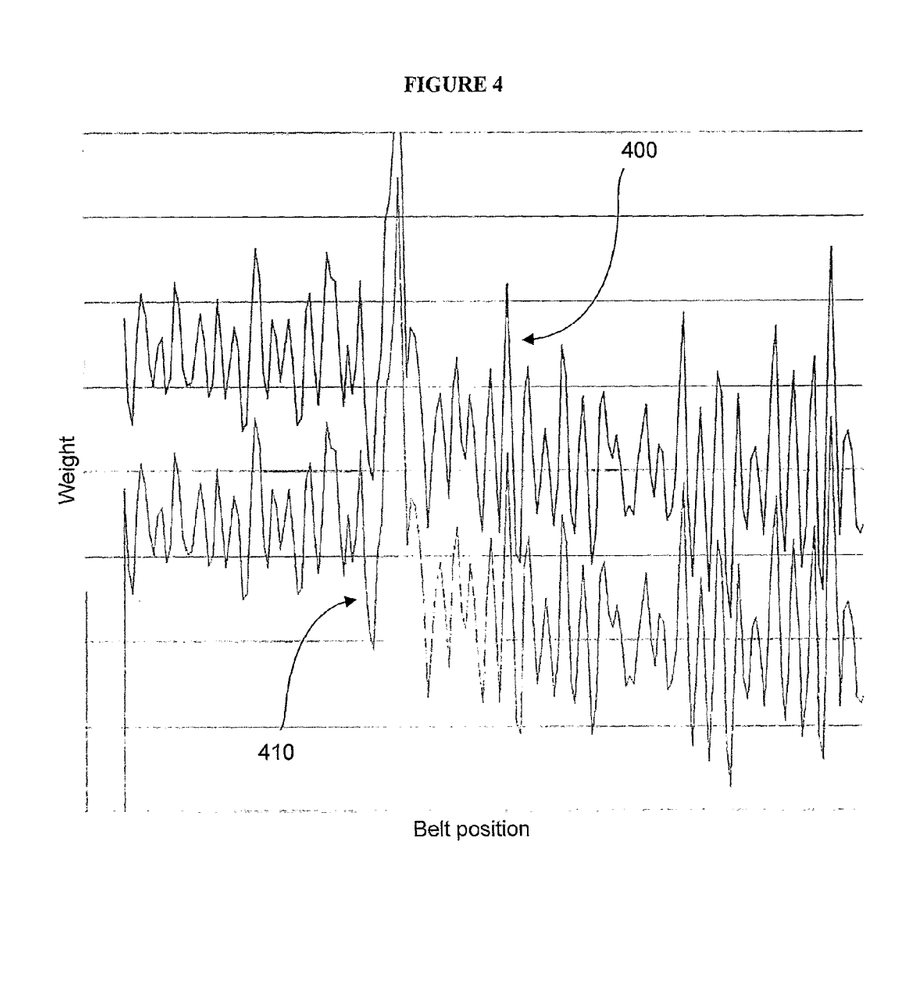
FIG. 4 illustrates a graph of the observed belt weight data offset from the recorded zero image data by a constant amount.

Referring to FIG. 4, there is shown a graph of the same situation presented in FIG. 3 except that the observed belt weight data 400 is offset from the recorded zero image data 410 by a constant amount.

Figure 5:
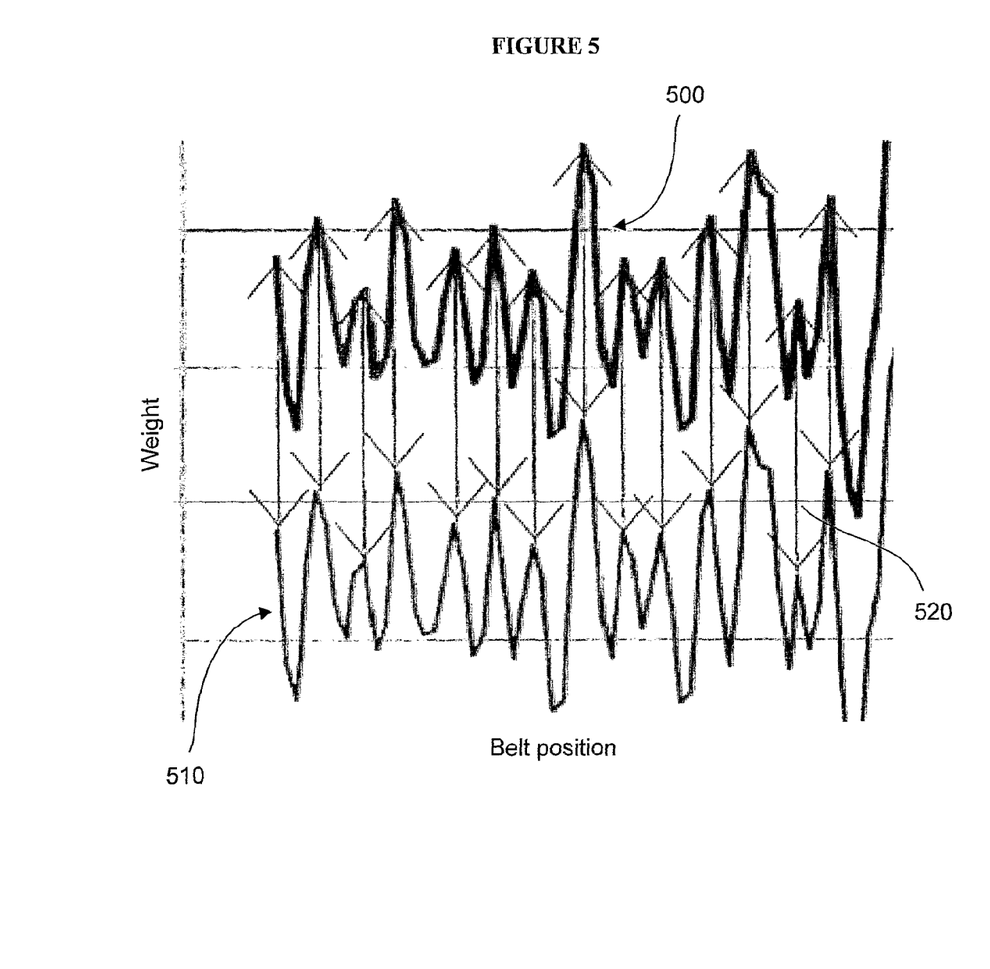
FIG. 5 illustrates a further graph showing observed belt weight data offset from recorded zero image data with vector lines.

This conceptually illustrates an important embodiment of one form of the invention, wherein a condition for an empty belt state is that the instantaneous difference between the stored zero image and the observed belt weight is equal to the average difference. Referring to FIG. 5, there is illustrated a graph again showing observed belt weight data 500 offset from recorded zero image data 510. The vector lines 520 emphasise the constant difference between the observed belt weight data 500 and the recorded zero image data 510 for corresponding sections of the belt.

This provides a method of identifying when a belt is in an empty state. The method can be performed in a processing system or electronics associated with the weigh frame. A check or calculation can be made to see if an instantaneous difference between a stored zero image and a measured belt weight, for a section of the belt, is equal to, or at least substantially equal to, a stored average difference. If so, the belt can be assumed or otherwise identified as being in an empty state.

Similarly, this provides a method of making a zero adjustment. By determining differences between measured belt weights and a stored zero image for corresponding sections of the belt, a check or calculation can be made to see if the differences are a constant, or at least substantially constant, for different sections of the belt. If so, at least part of the zero image (e.g. corresponding to the current belt segment) can be adjusted by using the constant.

Various methods, which can be implemented by the system, can be used to test whether the difference between each instantaneous weight record is equal to the average difference between weight records. However, particular examples are provided below.

System A. (1) Calculate a running average of the difference between the recorded zero image and the real time observed weight value, optionally using an exponential or other digital smoothing filter. (2) Calculate the difference between the running average and the instantaneous or current observed weight over the weigh frame, also optionally filtered using an exponential or other digital smoothing filter. When the calculated difference is less than a user settable limit, the belt is empty.

System B. (1) By keeping a real time memory buffer with the last 'x' belt segments or sections stored in the buffer, calculate a real average of the difference between the observed weight value and the stored zero image values for the last 'x' segments. (2) Calculate the difference between the instantaneous or current observed weight of the segment or section on the weigh frame and the stored zero image for that segment or section. (3) Determine the difference between the values calculated at (1) and (2) and when the difference is deemed small enough for sufficient samples, for example by comparison with a preset value, accept that the belt is empty.

System C. Techniques which utilise statistical theory could also be applied that establish that even though the belt is varying in weight one can determine that the weight is a constant offset, within an acceptable error margin, from what the weight was when the zero was last set. Statistical analysis can provide a rational basis for the number of samples needed to achieve a desired precision for the zero adjustment.

In a particular example, exponential filters are applied to observed weight values and are used to produce a running standard deviation calculation which then can be used as the basis for a decision on whether the belt is empty or loaded with material.

In a non-limiting example implementation, an exponential average approach is applied. The following variables can be calculated:

BIZT_SWTCWD: the exponentially averaged static weight on weigh frame observed when using the multiplicity of zeros available from a zero image recalled from memory in sequence with the belt;

BIZT_Diff: the exponential average of the difference between each weight result and the average weight result (optional);

BIZT_Diff_VAR: the exponential average of the square of the differences between each weight result and the average weight, i.e. the average of the difference between each instantaneous weight SWTCWD(i) and BIZT_WSTCWD squared;

BIZT_Diff_SD: the square root of BIZT_Diff_VAR, i.e. the square root of the variance.

In the process of placing a new image into service, an optional comparison of standard deviations for respective weight data can be made between an old image and a new image as a measure of similarity. This involves a normal standard deviation calculation of, preferably, the entire data set.

It is required that the belt image stored in memory is kept in synchronisation with the real belt. This may be achieved, for example, by use of a synchronisation pulse input to the belt weigher electronics or may be achieved using software by sliding the stored belt image over the latest real time captured image to cause the images to match, if the belt really is empty. A software synchronisation method is readily implementable using available high speed microprocessors. A synchronising pulse input can be readily achieved by some form of marker in or on the belt and a pickup sensor, for example a magnetic material in the belt and a magnetic proximity sensor or a visual belt marker and an optical sensor.

Once an average difference that meets the criteria has been obtained, so that the belt can be reliably assumed to be in an empty state, that average difference then becomes the adjustment to be made to the zero. With this feature properly implemented there is no longer any need to use the zero window technique as the defining start point for automatic zero tracking. Also, due to the level of confidence that the belt really is empty, there is no longer any need to apply the same level of verification checks, thereby allowing the determined zero adjustment to be put into service immediately. Additionally, there is no longer any need to require a full belt revolution before implementing the determined zero adjustment.

As a point of clarification, in the case of a perfectly uniform conveyor belt there would be no pattern of data to recognise. However, it would still be possible to distinguish between an empty belt and a loaded belt by the amount of variation in real time between belt loading versus the constant weight of the uniform belt. The belt image zero tracking system/method can be considered as creating the effect of a uniform belt even when there is a significant amount of belt weight variation, therefore allowing real belt loading due to the free flow of material on the belt to be identified. In other words, a uniform belt scenario would not prevent the belt image zero tracking system/method from working.

In another case the observed variation in belt weight along the length of the belt may not be very repeatable from one revolution of the belt to the next. In this case the weight measurement data from the weigh frame is overwhelmed by conveyor belt error noise. The proposed Zero Image comparison system is therefore able to provide a measure of the precision of the weigh frame and conveyor belt considered as a system. The differences between successive zero images recorded from successive revolutions of the belt becomes an excellent and hitherto unknown method of measuring the precision of the complete weigh frame and conveyor belt system. An errorless system would have a perfect match between successive zero images and there would be no belt weight variation component in the observed weight output. Systems which have less precision, that is more error, would have a more imperfect match between successive revolutions and the precision of fit could be assessed by calculating a standard deviation for each belt revolution. This Standard Deviation of error between successive images of the belt may be taken as a hitherto unavailable true measure of the precision of the belt weighing system. This measure may be used to either report the inherent accuracy of a belt weighing system or to make the decision that the Zero Image system is not beneficial to be used.

Figure 6:
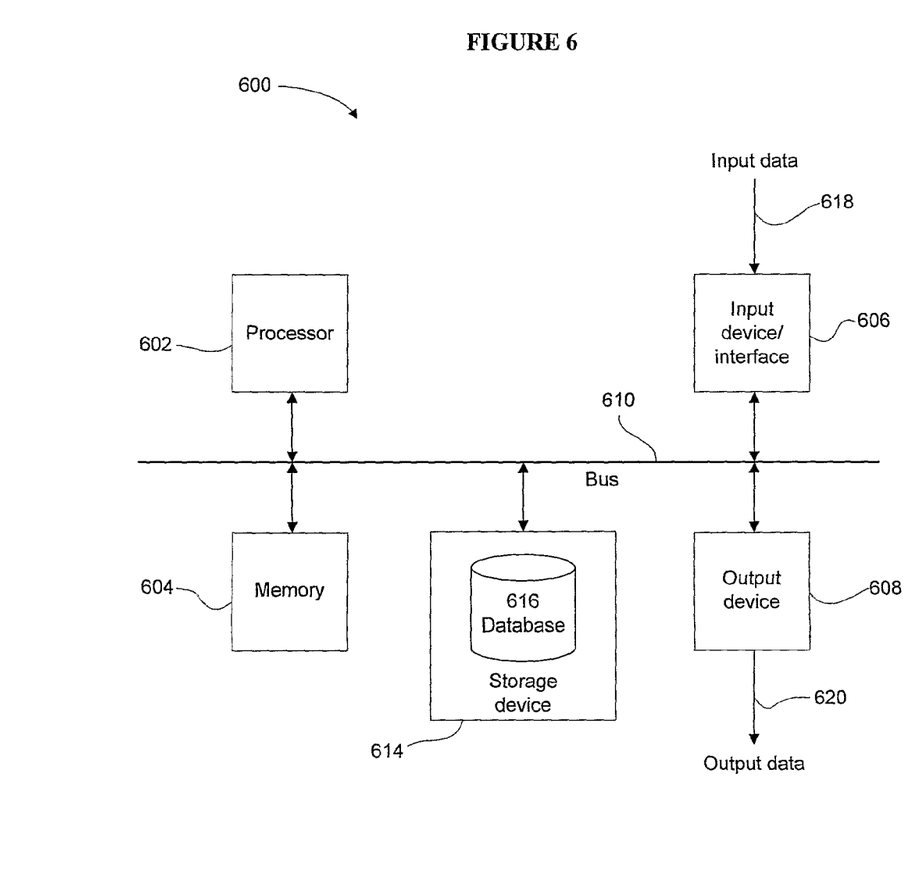
FIG. 6 illustrates an example processing system that can be used as part of the belt weighing system.

A particular embodiment of the present invention can be realised using a processing system, or dedicated microprocessor, an example of which is shown in FIG. 6. The processing system 600 generally includes at least one processor 602, or processing unit or plurality of processors, memory 604, at least one input device/interface 606 (e.g. interfaced to the weigh frame) to receive input data 618 and at least one output device 608, coupled together via a bus or group of buses 610. At least one storage device 614 which houses at least one database 616 can also be provided, locally or remotely. The memory 604 can be any form of memory device, for example, volatile or non-volatile memory, solid state storage devices, magnetic devices, etc. The processor 602 could include more than one distinct processing device, for example to handle different functions within the processing system 600.

Output device 608 produces or generates output data 620 and can include, for example, a display device or monitor in which case output data 120 is visual, a port for example a USB port, a peripheral component adaptor, a data transmitter or antenna such as a modem or wireless network adaptor, etc. A user could view data output, or an interpretation of the data output, on, for example, a monitor. The storage device 614 can be any form of data or information storage means, for example, volatile or non-volatile memory, solid state storage devices, magnetic devices, etc.

In use, the processing system 600 is adapted to allow weight data received as input data 618 to be stored in and/or retrieved from, via wired or wireless communication means, the memory 604 and/or the at least one database 616. Processed results can be displayed to a user by utilising output device 608. More than one input device 606 and/or output device 608 can be provided. It should be appreciated that the processing system 600 may be any form of microprocessor, computer, specialised hardware, or the like. The processing system 600 may be a part of a networked communications system.

Observed weight data, $W_{Measured}$, can be received from a weight measuring device as input data 618. Zero image data, providing zero settings ($W_0$) being $W_{0,1}$, $W_{0,2}$, $W_{0,3}$, $W_{0,4}$, ... $W_{0,x}$, can be stored in memory 604. Processor 602 can perform required calculations or processing on the observed weight data and the zero image data as previously described. This could include confirming or adjusting zero image data. Output data 620 can include the actual adjusted weight of material, and/or one or more control signals or indications of the weighing system functions, e.g. the belt is in an empty state, a zero adjustment was made, an alarm, a measure of precision, etc.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A belt weighing system, comprising:
 a belt, for conveying material, associated with a weigh frame;
 the weigh frame able to measure a belt weight of a section of the belt;
 at least one memory to store a zero image of the belt; and,
 at least one processor to determine a difference between the measured belt weight and the zero image for the section of the belt, and to determine when the difference is a constant in relation to different sections of the belt.

2. The belt weighing system of claim 1, wherein if the difference is a constant in relation to different sections of the belt, the system assumes an empty belt state.

3. The belt weighing system of claim 1, wherein the at least one memory stores an average of determined differences for different sections of the belt.

4. The belt weighing system of claim 3, wherein the at least one processor determines if the difference is a constant in relation to different sections of the belt by determining if the difference for the section of the belt is substantially equal to the stored average.

5. The belt weighing system of claim 1, including an output device to output a zero adjusted weight of conveyed material.

6. The belt weighing system of claim 1, including a synchronization means to check the belt is aligned with the zero image of the belt.

7. The belt weighing system of claim 1, including a sensor to identify a marker in or on the belt, the sensor used to provide a synchronizing pulse or signal.

8. The belt weighing system of claim 7, wherein the marker is a magnetic material or a visual indicator.

9. The belt weighing system of claim 3, wherein if the average satisfies verification criteria, the average is used as an adjustment made to at least part of the zero image.

10. The belt weighing system of claim 1, wherein if the difference is determined to be a constant in relation to different sections of the belt, the constant is used as an adjustment made to at least part of the zero image.

11. A method of identifying when a belt is in an empty state in a belt weighing system, the method performed in a processing system associated with a weigh frame and including the steps of:
 checking if an instantaneous difference between a stored zero image and a measured belt weight for a section of the belt is equal to a stored average difference; and if so, identifying the belt to be in an empty state.

12. A method of making a zero adjustment in a belt weighing system, the method performed in a processing system associated with a weigh frame and including the steps of:
 determining differences between measured belt weights and a stored zero image for corresponding sections of the belt;
 checking if the differences are a constant for different sections of the belt; and if so,
 adjusting at least part of the zero image by using the constant.

13. The method of claim 12, wherein the belt is determined to be in an empty state when the differences are constant to within less than a user settable limit.

14. The method of claim 12, wherein the processing system determines if the differences are a constant for different sections of the belt by determining if an instantaneous difference between the zero image and the measured belt weight for a section of the belt is equal to an average difference for different sections of the belt.

15. The method of claim 14, wherein the belt is determined to be in an empty state when the instantaneous difference is equal to the average difference to within less than a user settable limit.

16. The method of claim 14, wherein the average difference is a running average of differences between the zero image and the measured belt weights for different sections of the belt.

17. The method of claim 14, wherein determining if the instantaneous difference between the zero image and the measured belt weight for the section of the belt is equal to the average difference includes:
 (1) calculating the average difference for a selected number of previous belt segments;
 (2) calculating the instantaneous difference between the measured belt weight and the zero image for a current segment;

(3) calculating a difference between the average difference calculated at step (1) and the instantaneous difference calculated at step (2); and, (4) determining if the difference calculated at step (3) is less than a preset value, and if so assuming the instantaneous difference to be equal to the average difference.

18. The method as claimed in claim 11 wherein an exponential filter is applied to measured belt weights.

19. The method as claimed in claim 11, wherein differences between different zero images from successive revolutions of the belt are used as a measure of precision of the belt weighing system.

20. The method as claimed in claim 12 wherein an exponential filter is applied to measured belt weights.

21. The method as claimed in claim 12, wherein differences between different zero images from successive revolutions of the belt are used as a measure of precision of the belt weighing system.

* * * * *